(12) United States Patent
Yu et al.

(10) Patent No.: US 9,582,422 B2
(45) Date of Patent: Feb. 28, 2017

(54) HARDWARE PREFETCHER FOR INDIRECT ACCESS PATTERNS

(71) Applicant: INTEL CORPORATION, Santa Clara, CA (US)

(72) Inventors: Xiangyao Yu, Cambridge, MA (US); Christopher J. Hughes, Santa Clara, CA (US); Nadathur Rajagopalan Satish, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 105 days.

(21) Appl. No.: 14/582,348

(22) Filed: Dec. 24, 2014

(65) Prior Publication Data

US 2016/0188476 A1   Jun. 30, 2016

(51) Int. Cl.
G06F 12/00 (2006.01)
G06F 12/08 (2016.01)
G06F 9/30 (2006.01)
G06F 9/345 (2006.01)

(52) U.S. Cl.
CPC ...... *G06F 12/0862* (2013.01); *G06F 9/30047* (2013.01); *G06F 9/3455* (2013.01); *G06F 2212/602* (2013.01); *G06F 2212/6024* (2013.01); *G06F 2212/6026* (2013.01)

(58) Field of Classification Search
CPC ............ G06F 12/0862; G06F 9/30047; G06F 2212/602; G06F 2212/6024; G06F 2212/6026
See application file for complete search history.

(56) References Cited

U.S. PATENT DOCUMENTS 5,708,849 A   1/1998   Coke et al.
5,966,528 A   10/1999   Wilkinson et al.
(Continued)

FOREIGN PATENT DOCUMENTS

TW   201218771 A   5/2012

OTHER PUBLICATIONS

U.S. Appl. No. 14/335,006, filed Jul. 18, 2014, Hughes.
(Continued)

*Primary Examiner* — Shawn X Gu
(74) *Attorney, Agent, or Firm* — Jason H. Vick; Sheridan Ross, PC

(57) ABSTRACT

Two techniques address bottlenecking in processors. The first is indirect prefetching. The technique can be especially useful for graph analytics and sparse matrix applications. For graph analytics and sparse matrix applications, the addresses of most random memory accesses come from an index array B which is sequentially scanned by an application. The random accesses are actually indirect accesses in the form A[B[i]]. A hardware component is introduced to detect this pattern. The hardware can then read B a certain distance ahead, and prefetch the corresponding element in A. For example, if the "prefetch distance" is k, when B[i] is accessed, the hardware reads B[i+k], and then A[B[i+k]]. For partial cacheline accessing, the indirect accesses are usually accessing random memory locations and only accessing a small portion of a cacheline. Instead of loading the whole cacheline into L1 cache, the second technique only loads a part of the cacheline.

20 Claims, 14 Drawing Sheets

(56) References Cited

U.S. PATENT DOCUMENTS

| | | | |
|---|---|---|---|
| 7,539,844 B1 * | 5/2009 | Ekanadham | G06F 12/0862 711/137 |
| 7,627,735 B2 | 12/2009 | Espasa et al. | |
| 7,647,557 B2 | 1/2010 | Janus | |
| 8,074,026 B2 | 12/2011 | Kim et al. | |
| 8,447,962 B2 | 5/2013 | Hughes et al. | |
| 8,478,941 B2 | 7/2013 | Hughes et al. | |
| 8,578,097 B2 | 11/2013 | Kim et al. | |
| 8,667,221 B2 | 3/2014 | Kim et al. | |
| 8,688,957 B2 | 4/2014 | Smelyanskiy et al. | |
| 8,799,577 B2 | 8/2014 | Hughes et al. | |
| 8,892,848 B2 | 11/2014 | Sprangle et al. | |
| 2002/0035675 A1 * | 3/2002 | Freerksen | G06F 12/0831 711/151 |
| 2011/0153983 A1 | 6/2011 | Hughes et al. | |
| 2013/0159679 A1 | 6/2013 | McCormick, Jr. et al. | |
| 2013/0318306 A1 | 11/2013 | Gonion | |
| 2014/0019712 A1 | 1/2014 | Ould-Ahmed-Vall et al. | |
| 2014/0095779 A1 | 4/2014 | Forsyth et al. | |
| 2014/0281425 A1 | 9/2014 | Valentine et al. | |

OTHER PUBLICATIONS

"Intel Advanced Vector Extensions Programming Reference" Jun. 2011, pp. 1-3, 5-258-280, A-17-18 (28 pages).

"Intel 64 and IA-32 Architectures Software Developers Manual" Feb. 2014, pp. 1-2; vol. 1: 5-23, 11-12, 11-25, 12-12-14; vol. 2A 3-547-559; vol. 3A; 11-17 (22 pages) Combined Volumes: 1, 2A, 2B, 2C, 3A, 3B and 3C.

Moritz et al. "An Introduction to Prefetching" Software System and Architecture Lab, Electrical and Computer Engineering, University of Massachusetts, Amherst, Nov. 2007.

Rothman et al. "Sector Cache Design and Performance" Report No. UCB/CSD-99/1034, Computer Science Division (EECS) University of California, Berkeley, California, Jan. 1999.

Official Action and Search Report, including Translation, for Taiwanese Patent Application No. 104118928, mailed Apr. 25, 2016.

Office Action for U.S. Appl. No. 14/335,006, mailed May 13, 2016.

Notice of Allowance for U.S. Appl. No. 14/335,006, mailed Nov. 3, 2016.

* cited by examiner

HARDWARE PREFETCHER FOR INDIRECT ACCESS PATTERNS

TECHNICAL FIELD

An exemplary aspect relates to processors. In particular, exemplary embodiments relate to processors and memory as well as methods and techniques for a hardware pre-fetcher for indirect access patterns.

BACKGROUND

Processors are commonly operable to perform instructions to access memory and perform computations. For example, processors may execute load instructions to load or read data for memory and/or store instructions to store or write data to memory, to facilitate various computational processes. Additionally, processors execute one or more applications to, for example, solve problems, analyse data, perform computations, and the like.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

Figure 1:
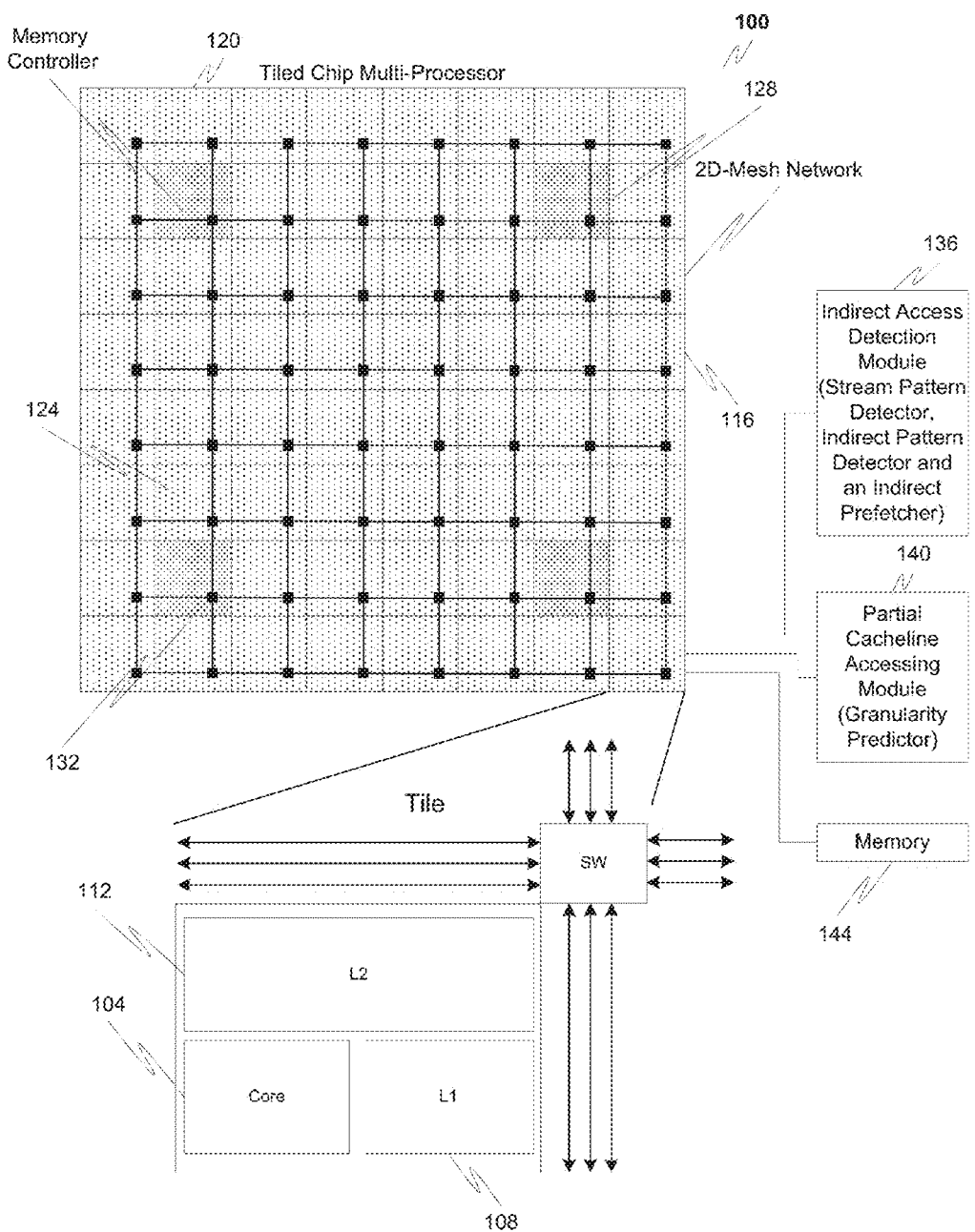
FIG. 1 illustrates an exemplary tiled chip multi-processor.

A couple of exemplary applications that require significant computational through-put are graph analytics and sparse matrix applications. Graph analytics is the study and analysis of data that can be converted or transformed into a graph representation, with the graph representation including notes and links. Graph analytics is especially useful for analysing big data problems and, for example, allowing scientists to more quickly realize value from big data than previous solutions.

Sparse matrix applications facility numerical analysis where a sparse matrix is a matrix in which most of the elements are zero. In contrast, if most of the elements are not zero, then the matrix is referred to as a dense matrix. The fraction of zero elements in a matrix is called the scarcity of the matrix, and the fraction of non-zero elements in a matrix is called the density of the matrix. Conceptually, scarcity corresponds to systems which are loosely coupled. Consider a line of balls connected by springs from one to the next: this is a sparse system as only adjacent balls are coupled. By contrast, if the same line of balls had springs connecting each of the balls to all other balls, the system would correspond to a dense matrix. The concept of scarcity is used in computational and application areas such as network theory, which have a low density of significant data or connections. Large sparse matrices often appear in scientific or engineering applications when solving partial differential equations. When storing and manipulating sparse matrices on a computer, it is beneficial and often necessary to use specialized algorithms and data structures that take advantage of the sparse structure of the matrix. Operations using standard dense-matrix structures and algorithms are slow and inefficient when applied to large sparse matrices as processing a memory are wasted on the zeros. Sparse data is by nature more easily compressed and thus requires significantly less storage. Some very large sparse matrices are infeasible to manipulate using standard dense-matrix algorithms. (See Wikipedia)

Some exemplary embodiments refer to a matrix, where a matric can be stored as a two-dimensional array. Each entry in the array represents an element $A_{i,j}$ of the matrix and is accessed by two indices i and j. Conventionally, i is the row index, numbered from top to bottom, and j is the column index, numbered from left to right. For an m×n matrix, the amount of memory required to store the matrix in this format is proportional to m times n (discounting the fact that the dimensions of the matrix may also need to be stored).

In the case of a sparse matrix, substantial memory requirement reductions can be realized by storing only the non-zero entries. Depending on the number and distribution of the non-zero entries, different data structures can be used to yield a huge savings in memory. The caveat is that accessing individual elements becomes more complex and additional structures are needed to be able to recover the original matrix unambiguously.

Moreover, in many graph analytics and sparse matrix applications, performance is limited by latency and bandwidth of the lower levels of the memory hierarchy, especially of the on-die network and DRAM. These applications contain a large number of L1 misses to random memory locations, limiting the benefit of hardware prefetchers which capture regular streams. Furthermore, the amount of computation done on each element is relatively small, making bandwidth another serious performance bottleneck.

It is with these and other considerations in mind that the disclosed techniques and various embodiments have been developed for indirect prefetching, partial cacheline accessing, reduction of on-die network traffic and memory traffic.

Exemplary embodiments address problems with prior solutions that resolve random memory accesses through software prefetching and correlation hardware prefetchers. one drawback associated with software prefetching is that it requires programmers or compilers to insert prefetch instructions into the source code to fetch the data, and is thus not very easy to use.

Software prefetching is also notoriously non-portable because latency varies across different hardware platforms, and the prefetching instructions incur a performance overhead. Correlation pre-fetchers learn a repeating irregular memory access pattern, and through each misaddress, they record the next several misaddresses. Later, when the correlation prefetcher sees an access to an address that previously missed in the cache, the correlation prefetcher prefetches the recorded addresses. However, this can capture arbitrary address patterns. This technique also incurs large storage and bandwidth overhead in order to store the pattern. This solution also only works on repeated access patterns, and does not help the first time the pattern is swept.

While several solutions have been proposed to reduce on-die network and memory traffic, they require either complex hardware, software changes, and/or programmer involvement.

Discussed herein are exemplary techniques that can optionally be used in conjunction, to at least address the above-identified bottlenecking and other issues. The first technique is indirect prefetching. This technique can be especially useful for graph analytics and sparse matrix applications as identified above, however it is not limited thereto.

For graph analytics and sparse matrix applications, the addresses of most random memory accesses come from an index array B which is sequentially scanned in the application. The random accesses are actually indirect accesses in the form A[B[i]]. As discussed herein, a hardware component and associated logic is introduced to detect this pattern. The hardware can then read B a certain distance ahead, and prefetch the corresponding element in A. For example, if the "prefetch distance" is k, when index B[i] is accessed, the hardware reads B[i+k], and then A[B[i+k]].

For partial cacheline accessing, the indirect accesses discussed above are usually accessing random memory locations and only touching/reading a small portion of a cacheline. Instead of loading the whole cacheline into L1 cache, an exemplary embodiment discloses logic which only loads part of the cacheline most likely to be used. This technique saves at least bandwidth and power.

In accordance with one exemplary embodiment, both solutions are implemented solely in hardware and accompanying logic and no programmer input needs to be involved. The hardware and storage overhead are also relatively small which is another exemplary advantage of the techniques disclosed herein. However, in accordance with one exemplary embodiment, software can optionally be used to indicate which loads/stores access index arrays, to further improve the benefits associated with the prefetcher.

Because of the intensive computational and memory demands of graph analytics and sparse matrix applications, these applications are particularly suitable to be run on multi-core processor architectures. FIG. 1 illustrates an exemplary portion of a tiled chip multi-processor, and in particular a 2D-mesh network 100. Each tile within the chip multi-processor 100 includes a core 104, L1 cache 108 and L2 cache 112, as well as other well-known and conventional componentry which has been omitted for clarity.

For the tiled chip multi-processor 100, the processor 100 is connected to a memory, an indirect access detection module 136 (which includes an indirect pattern detector and an indirect prefetcher), and a partial cacheline accessing module 140 (which includes a granularity predictor) which are coupled together by a coupling mechanism (not shown) such as one or more interconnects, a chipset, or the like. While the illustrated tiled chip multi-processor includes one indirect access detection module 136 and partial cacheline accessing module 140, it is to be appreciated that more than one of each of these elements could be used with the processor 100—for example, one for each core 104, or one for a plurality of cores 104.

As discussed, the processor includes a plurality of processor cores 104. In the illustrated example, the processor includes a first core 104 with corresponding cores in each of the tiles 116-124, etc. Also included is a plurality of memory controllers, such as memory controllers 128, 132. The processor may also include any desired number of cores, often ranging from one to hundreds or more. Typically, each tile within the processor may also have one or more caches such as L1 cache 108 and L2 cache 112. The caches may represent relatively smaller and faster types of storage than the memory 144. The caches may also be physically closer to the cores and/or execution units than the memory 144 may be. The caches 108, 112 may be used to cache or store data brought into the processor 100 from the memory 144 to provide faster subsequent accesses to data. When the processor 100 wants to read data from the memory 144, or write data to the memory 144, the processor may first check to see if a copy of the data is already stored in one of the caches (L1, L2). If the data is found in one of the caches, the processor may access the data from the cache more quickly than if the data were accessed from the memory 144. As a result, including caches in the processor architecture helps to reduce the average amount of time needed to access data to be processed by the processor. This in turn can assist with improving the performance and/or throughput of the processor.

As illustrated in FIG. 1 the exemplary processor 100 includes multiple cores and the corresponding caches with the cache level differing based on their relative closeness to the cores and/or execution units of each core processor. Core 104 has a first level cache or Level 1 (L1) cache 108. Each of the respective L1 caches may be dedicated to the corresponding core in which they are included. The L1 cache represents the cache level closest to the core 104. The processor also has a second level cache or Level 2 (L2) cache 112. The L2 cache represents the next closest cache level to the core 104. In some situations, the L2 cache may be shared by one or more other cores, and although not shown, there may optionally be one or more additional caches farther from the core 104, such as a Level 3 (L3) cache, etc. Caches that are closer to the cores generally tend to be smaller than caches farther from the cores. Commonly, one or more cache levels relatively closer to the cores are monolithically integrated on-die with the cores, whereas one or more cache levels farther from the cores may either be monolithically integrated on-die with the cores, or may be off-die, e.g., in a separate chip mounted on the motherboard. Accesses from the core to L1 cache tends to be faster than accesses to the L2 cache, and accesses from the core to the L2 cache tend to be faster than accesses to the L3 cache, and so on. Similarly, accesses from the core to the L3 cache tend to be faster than accesses from the core to the external memory.

One reason for including caches in processors is that memory references often have a "locality" attribute. For example, references to data in memory often have temporal and/or special locality. Temporal locality implies that when data is accessed from an address in memory, the same data is likely to be accessed again within a short period of time.

By way of example, this may be the case when a same value needs to be reused in a loop, used repetitively in a set of calculations, or for various other reasons. In such cases, it may be beneficial, after accessing the data from the memory, to store the data in a cache so that subsequent accesses to data may be performed more quickly from the cache instead of slowly from the memory.

Spatial locality implies that when a given data is accessed from an address in memory, nearby data and nearby addresses are also likely to be accessed within a short period of time. By way of example, both sets of data may be part of the same content, e.g., an image, data structure, video, or the like, and may be processed around the same time. Special locality may also occur for various other reasons. Caches take advantage of the spatial locality by storing not only the data initially needed, but also nearby data from nearby addresses. Typically, the minimum amount of data accessed from the memory and stored in a cache is a whole cacheline amount of data even when only a much smaller amount of data may initially be needed. For example, typically an entire 512-bit cacheline may be accessed from memory and stored in a cache, even if only a single 8-bit, 16-bit, 32-bit or 64-bit data element is initially needed. If spatial locality exists and is used, this can be beneficial since it is likely that the additional data brought into the cache will also be needed in the near future.

In order for caches to be effective, it is important to keep them filled with relevant data that is likely to be needed in the future by the core. During operation, data in the caches will be continually changed by evicting data that is not likely to be needed in the near future to make room for data that is likely to be needed in the near future. Various replacement algorithms and policies are known in the art for the purpose. Such replacement algorithms and policies are often heavily based on the age of the data due to temporal locality.

Figure 2:
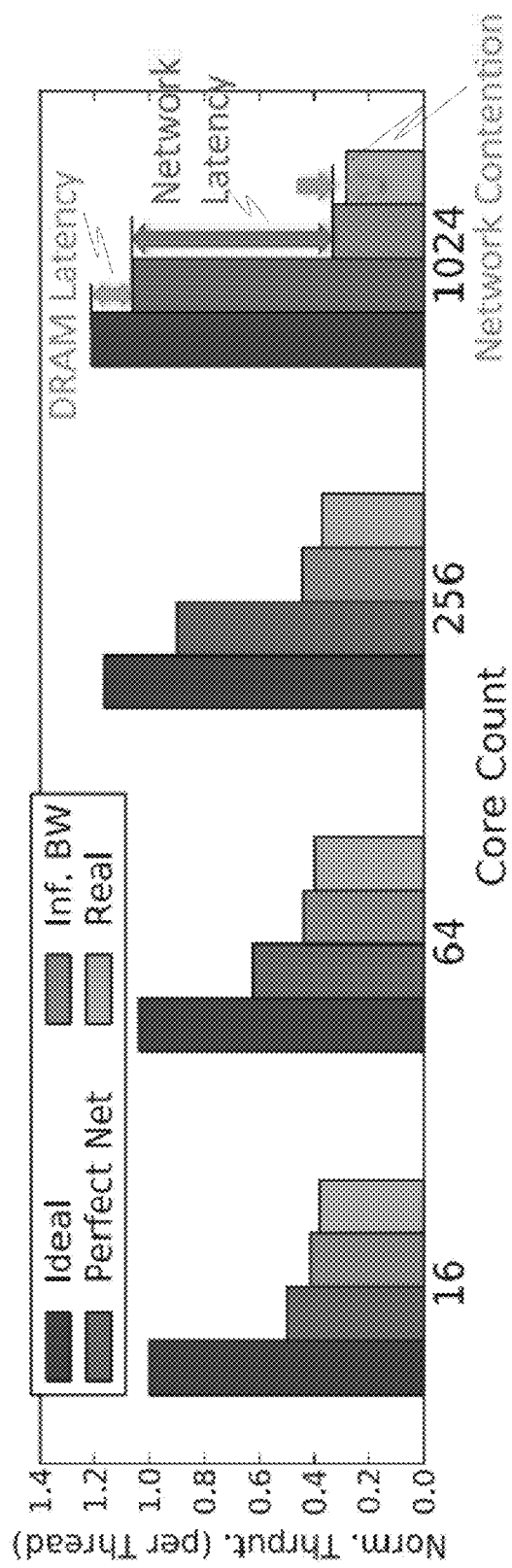
FIG. 2 illustrates an exemplary graph illustrating where bottlenecks exists.

With multi-core architecture processors, bottlenecks exist that limit throughput. FIG. 2 is a chart comparing the number of cores to the normal throughput (per thread). As can be seen, the comparison is made between ideal conditions with a perfect network and no DRAM latency. The ideal conditions in the perfect network scenario are compared to a perfect network scenario, which has infinite bandwidth and no network latency, and an infinite bandwidth scenario, that has a realistic network and DRAM models with network contention, and a real scenario, that includes a realistic network and DRAM models. As can be seen in the graph, DRAM latency, network latency, and network contention all have real-world impacts on the throughput.

As discussed, hardware prefetchers only capture streaming access patterns. Some of the downsides associated with software prefetching include that they are hard to use, portability, register pressure and instruction overheard.

In accordance with one exemplary embodiment, an indirect prefetcher as described herein detects patterns like A[B[i]], which is very common in graph analytics and sparse matrix applications. Here, array B is the index array and is accessed sequentially.

Figure 3:
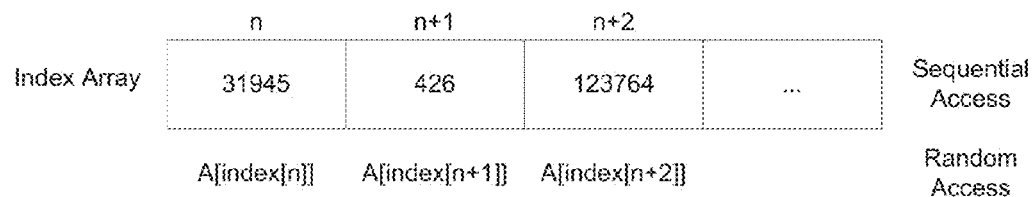
FIG. 3 illustrates an exemplary indirect access pattern.

Indirect prefetching by the indirect prefetcher and associated logic contains three exemplary main steps:
1. Stream pattern detection;
2. Indirect pattern detection; and
3. Indirect prefetching FIG. 3 illustrates an exemplary indirect access pattern for an index array. Within the index array, n, n+1 and n+2 represent sequential accesses. Corresponding random accesses are A[index]n]], A[index[n+1]] and A[index[n+2]]. This is a common pattern in graph and sparse matrix algorithms. The exemplary techniques discussed herein can prefetch the indirect accesses following this pattern.

Figure 4:
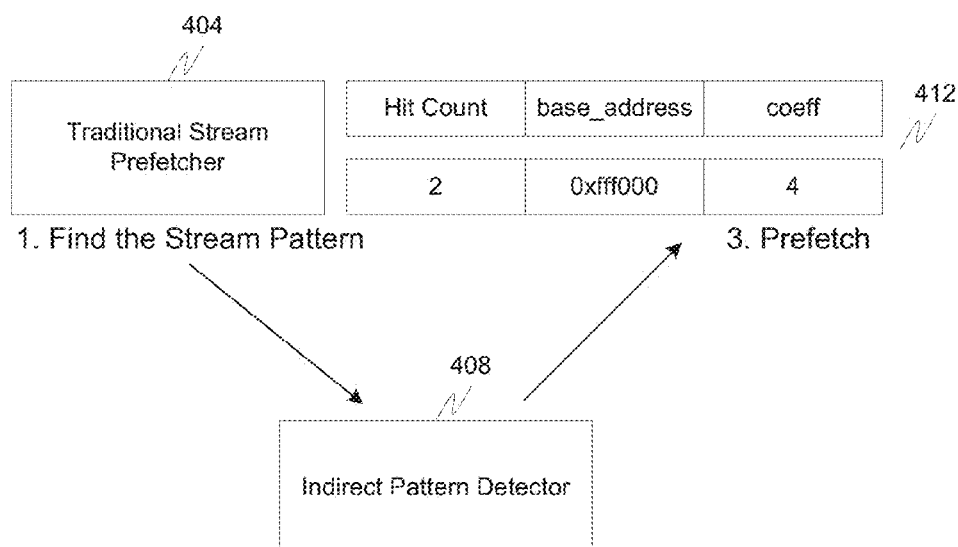
FIG. 4 illustrates an exemplary indirect pattern detector.

As illustrated in FIG. 4, the indirect prefetcher tries to detect patterns like A[B[i]], utilizing the steps enumerated above.

In step 1, the stream pattern detector can be similar to a traditional stream prefetcher 404. The traditional stream prefetcher 404 (which can be implemented as a microcontroller) is able to determine the stream accessing pattern to array B. Additional details regarding traditional stream prefetcher are well known by those of skill in the art and will not be discussed in greater detail herein. However, additional details regarding traditional stream prefetchers can be seen at: *An Introduction to Prefetching*, Csaba Andras Moritz, November, 2007, Software System and Architecture Lab, Electrical and Computer Engineering, University of Massachusetts, Amherst.

In step two, once the stream pattern is detected by the traditional stream prefetcher 404, the indirect pattern detector 408 (which can be implemented as a microcontroller) tries to detect indirect patterns for this stream. The indirect address and index value follow:

indirect_address=coeff*index+base_address.

Here, coeff is the size of the data element, index is the index array such as B[i], and base_address is the address of A[0].

Figure 5:
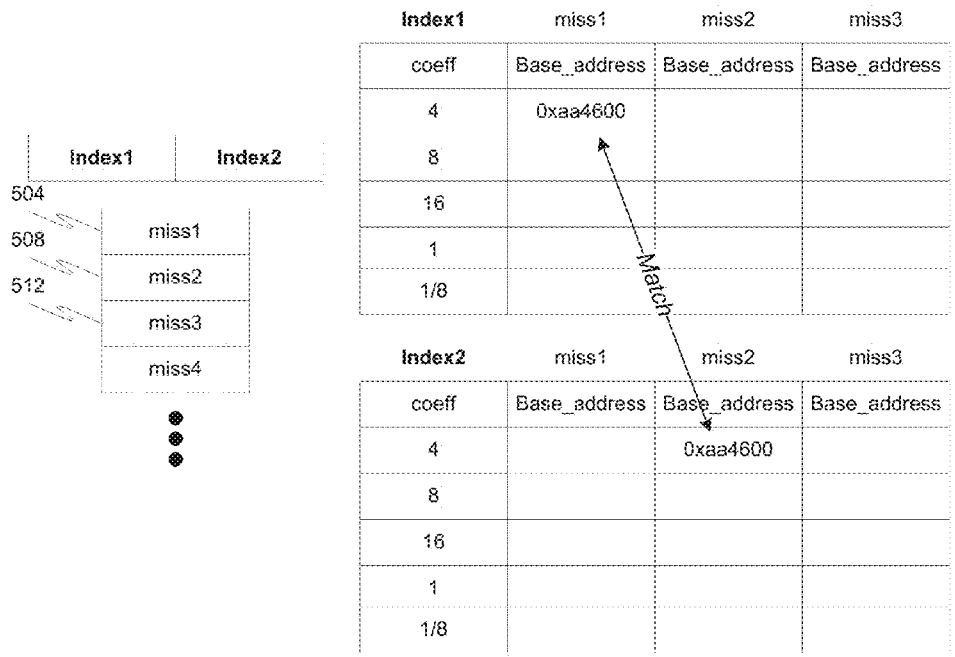
FIG. 5 illustrates an exemplary indirect prefetcher.

Indirect pattern detector 408 keeps track of at least two indices (which are stored in a memory/register(s)) as shown in FIG. 5 as index1 and index2. It should be appreciated however that additional indices can be provided, such as a third index for verification, a fourth index, and so on. The indirect pattern detector 408 also keeps track of a certain number of cache misses that occur before the next index access. As shown in FIG. 5, there are at least two misses, 504, 508, with additional misses capable of being tracked based on hardware overhead. The possible values of coeff can be limited to small powers of two, since this is the size of the data access in bytes. However, it should be appreciated that coeff could be other values, such as 1, ⅛, and/or could be arbitrary. Thus, one can enumerate all possible coeff values and calculate the corresponding candidate base_addresses for each (index, misaddress) pair. For each coeff, if a candidate base_address of index1 matches the later candidate base_address for index2, then an indirect pattern has been found.

In step three, the coeff value and base_address value is stored next to the stream information in the indirect table entry 412 as shown in FIG. 4. Later indirect hits/misses will increment/decrement the hit_count field in the storage entry. When hit_count saturates (e.g., reaches two), the system has found and identified the indirect pattern, and indirect prefetching can begin with the indirect prefetcher 136. When the next element in the stream is accessed (B[n]), the indirect prefetcher can jump a certain distance (k) ahead and read B[n+k]. When that read completes, the indirect prefetcher 136 prefetches address=coeff*B[n+k]+base_address.

The prefetch distance k can change dramatically. For example, for the first hit, k=1 and k increases as more hits happen and the system becomes more confident that it will access more elements from this pattern. k will freeze when a threshold is reached (e.g. k_max=16). After some time, if the prefetcher is not producing useful prefetches, the value of k can be decreased.

Figure 6:
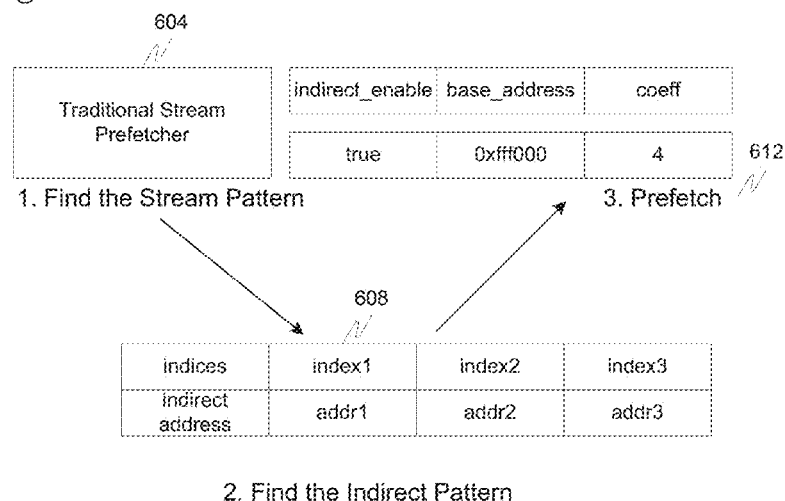
FIG. 6 indicates another exemplary indirect prefetcher.

FIG. 6 illustrates another exemplary embodiment of the indirect prefetcher's operation. Here, the traditional stream prefetcher finds, in a first step 604, the stream pattern. Next, in the second step 608, the indirect pattern is found using the indirect pattern detector. Here the system includes three indices: Index1, Index2 and Index3, with corresponding indirect addresses (addr1, addr2, addr3). As a result of finding the indirect pattern, this third step 612 prefetches the cacheline at address coeff*B[n+k]+base_address=4*B[n+k]+0XFFF000.

Figure 7:
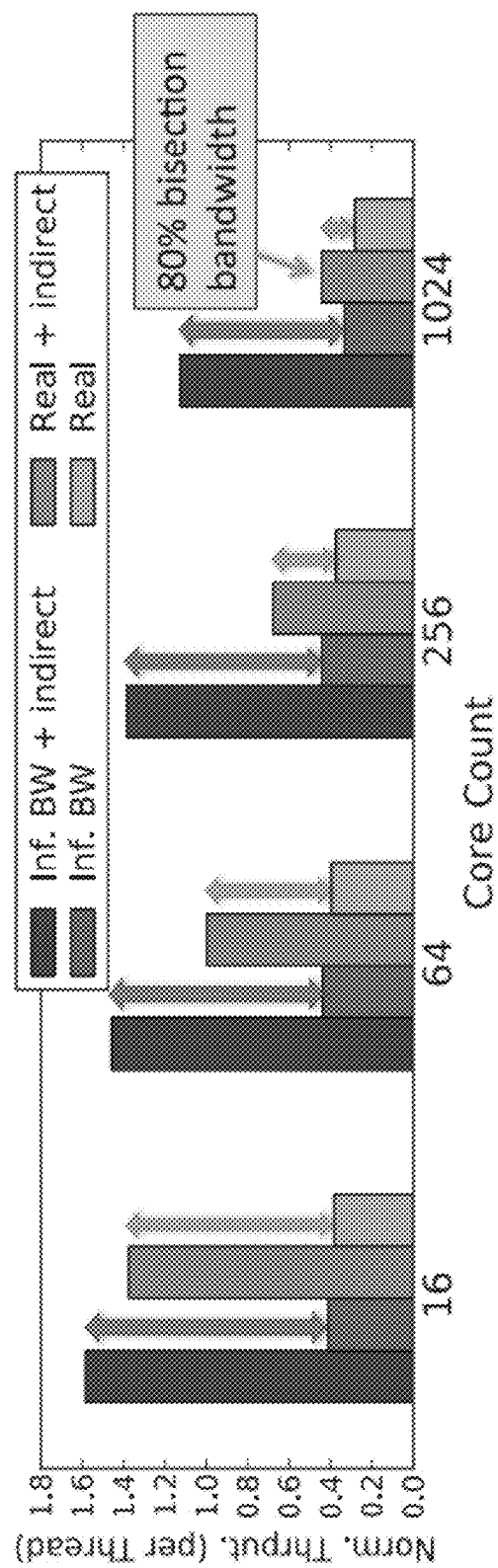
FIG. 7 is a chart illustrating exemplary performance gain for the indirect prefetcher.

FIG. 7 is a table outlining the performance increase attributable to the indirect prefetcher techniques discussed herein. As can be seen in the chart, for infinite bandwidth networks, performance gain is approximately 4× for all network sizes. For real networks, performance gain decreases as network size increases. Thus, network bandwidth becomes the bottleneck. In conjunction with the indirect prefetching discussed above, partial cacheline access can complement and further improve efficiencies by just loading the data that is needed. Partial cacheline accessing at least addresses the latency and bandwidth problems as highlighted herein.

More specifically, when indirect prefetching occurs, a granularity predictor in the partial cacheline accessing module 140 can decide whether the whole cacheline should be brought into the private cache (e.g., L1 or L2 cache), or only a subset should be brought into the cache. In the latter case, the granularity predictor can also decide the size of data that should be brought into the cache.

In one embodiment, sectored cache can be used to hold full or partial cachelines. A sectored cache tracks which part(s) of each cacheline it is currently holding. Additional details regarding sectored caches can be found in Sector Cache Design and Performance, Jeffrey B. Rothman and Alan Jay Smith, Report No. UCB/CSD-99-1034, January 1999.

However, rather than use a single valid bit to indicate that the line is in the cache, sectored cache uses a presence mask to indicate which chunks of a cacheline are valid. In one exemplary embodiment, a chunk size can be chosen that matches the size of an on-die network flit (e.g., 64 bites), since that is the minimum amount of data that can be moved around on the exemplary on-die network.

The granularity predictor in the partial cacheline accessing module 140 can predict how many chunks to fetch for each cacheline that is prefetched. A simple granularity predictor design is to always fetch the amount of data touched by the indirect load/store instruction. A more sophisticated embodiment can use a sampling approach to allow for larger fetches. The system may randomly sample some prefetched cachelines and count the number of chunks accessed before they are evicted. If only a small subset of data is touched, then the granularity predictor can keep fetching partial cachelines. Otherwise, the granularity predictor can switch back and start to fetch full cachelines. As illustrated, these techniques have been simulated through several graph workloads (page rank, triangle counting, stochastic gradient descent, and locality-sensitive hashing, as well as sparse matrix-ventral multiplication running on a chip with tens to hundreds of cores). With the techniques disclosed herein, up to a 4×performance gain has been realized.

Figure 8:
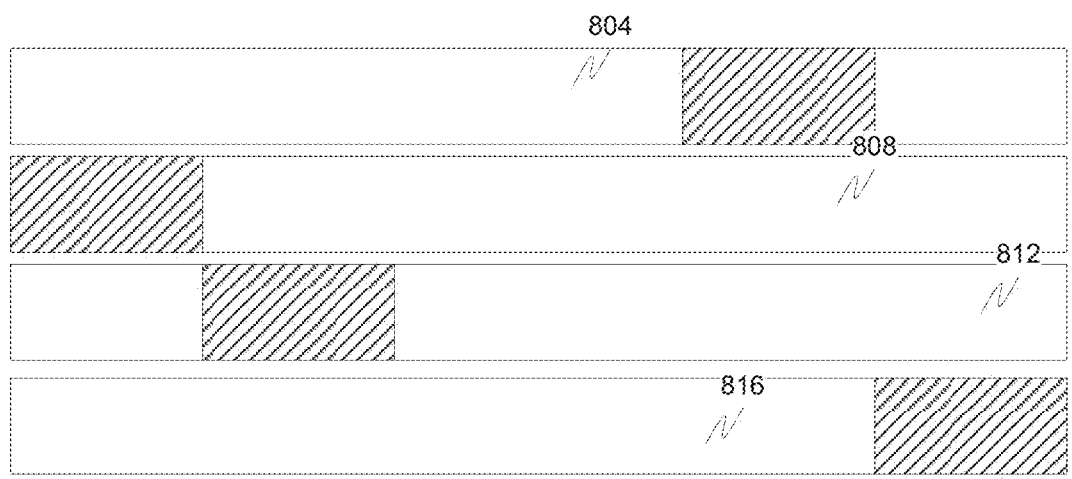
FIG. 8 illustrates an exemplary cacheline access.

For example, for many graph applications, only a partial cacheline is touched before the cacheline is evicted from the L1 cache as shown in FIG. 8. In FIG. 8, partial portions of the cacheline that are touched are illustrated as shaded, while the remaining portion of the cacheline 804, 808, 812, 816, remain untouched.

Figure 9:
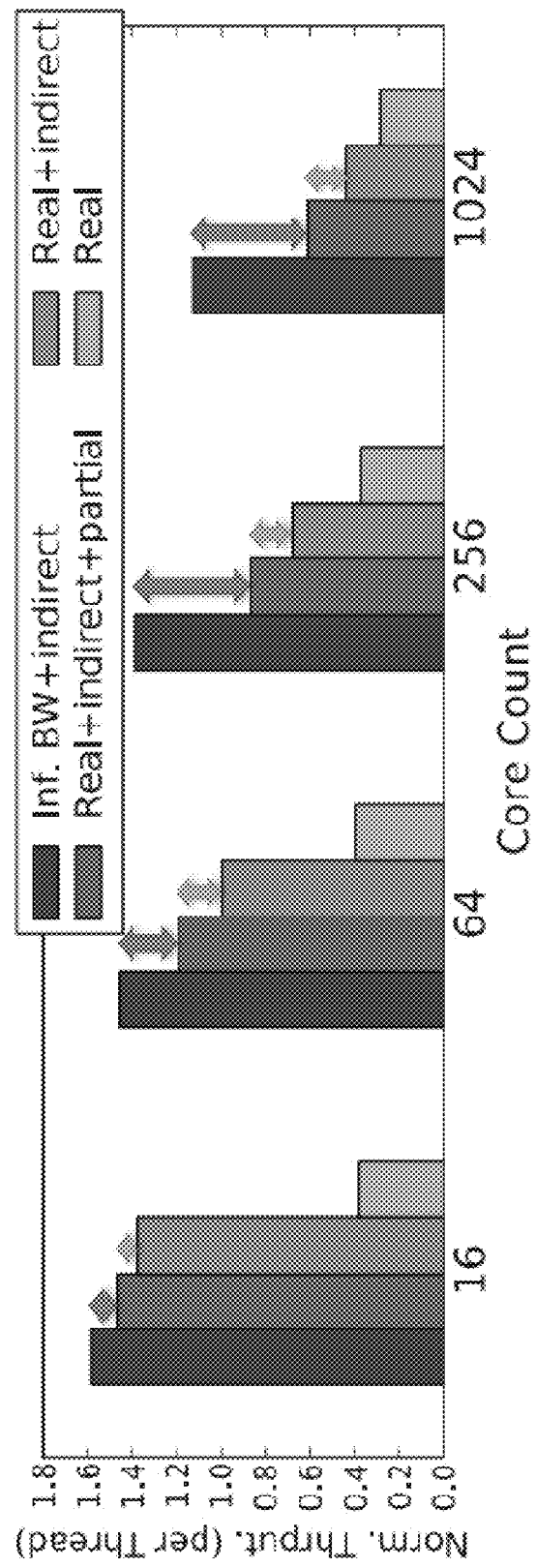
FIG. 9 is a chart illustrating exemplary performance gains due to partial cacheline accessing.

FIG. 9 is a graph illustrating the performance gain due to partial cacheline accessing. Here, the throughput differences for different numbers of cores are compared between: infinite bandwidth and indirect prefetching, real bandwidth and indirect prefetching with partial cacheline accessing, real bandwidth and indirect prefetching and real bandwidth.

Figure 10:
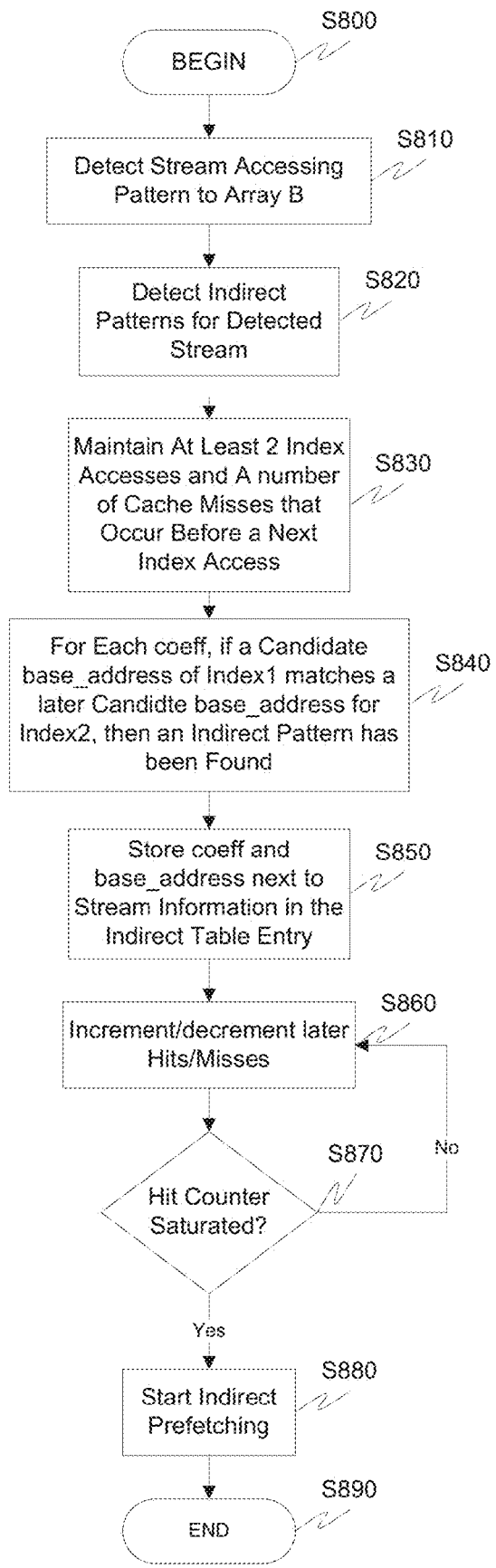
FIG. 10 is a flowchart illustrating an exemplary method for performing indirect prefetching.

FIG. 10 outlines an exemplary method for indirect prefetching. In particular, control begins in step S800 and continues to step S810. In step S810, the stream accessing pattern to array B is determined. Next, in step S820, indirect patterns for the detected stream are determined. Then, in step S830, at least two index accesses and a number of cache misses that occur before a next index address are counted and recorded in storage. Control then continues to step S840.

In step S840, and for each coeff, if a candidate base_address of index1 matches a later candidate base_address for index2, then an indirect pattern has been found. Next, in step S850, the coeff and base_address next to the stream information in the indirect table entry is stored. Then, in step S860, the hits/misses are incremented/decremented accordingly. Control then continues to step S850.

In step S850, a determination is made whether the hit counter is saturated. If the hit counter is saturated, control continues to step S880, with control otherwise jumping back to step S860.

In step S880, indirect prefetching commences, with control continuing to step S890 where the control sequence ends.

Figure 11:
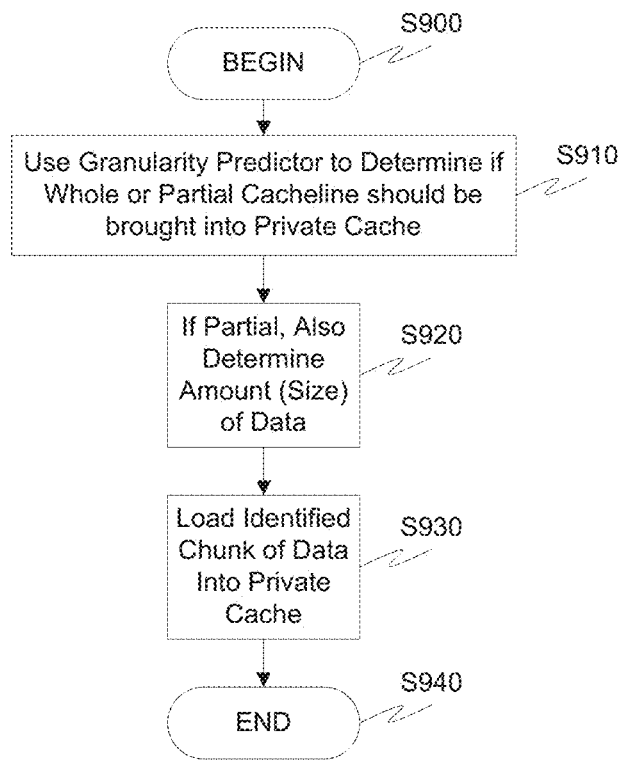
FIG. 11 is a flowchart illustrating an exemplary method for partial cacheline accessing.

FIG. 11 outlines an exemplary method for partial cacheline accessing. In particular, control begins at step S900 and continues to step S910. In step S910, a granularity predictor is used to determine whether a whole or partial cacheline should be brought into private cache. Next, in step S820, and if a partial cacheline should be brought into private cache, the amount or size of data to bring into the private cache is also determined. Then, in step S930, the identified chunk of data is loaded into private cache with control continuing to step S940 where the control sequence ends.

Figure 12:
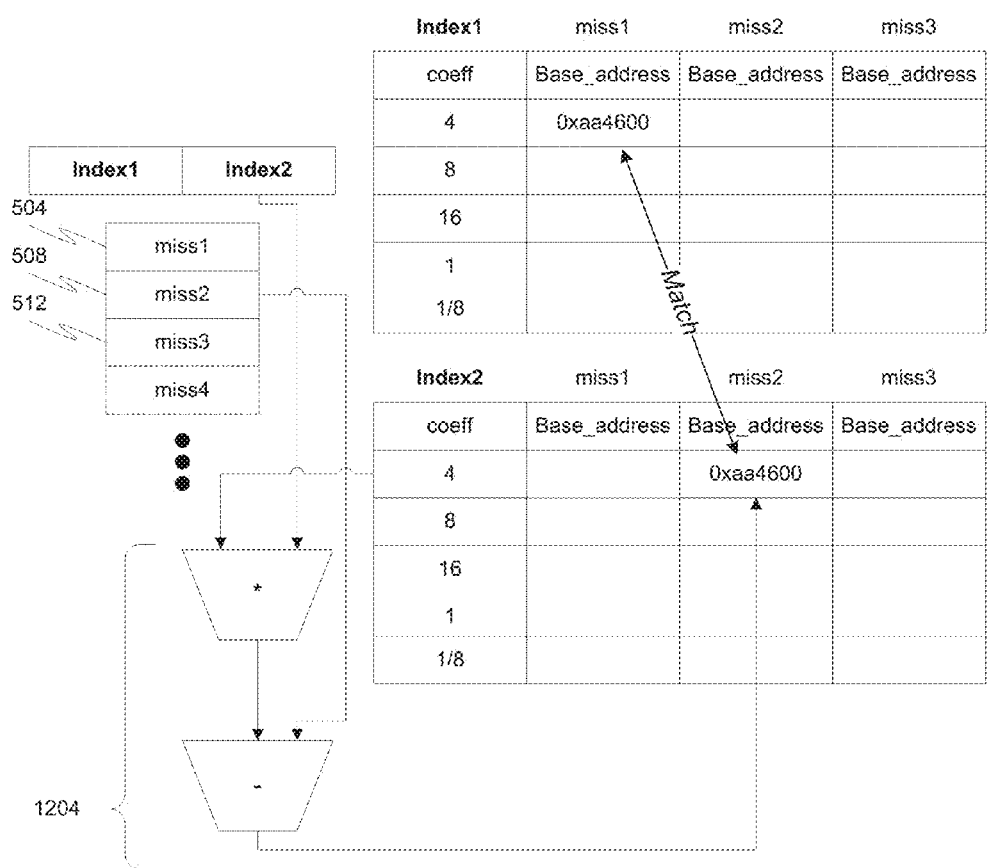
FIG. 12 illustrates exemplary logic to perform a determination of a candidate base address.

FIG. 12 illustrates a variation on the above embodiments and illustrates logic to perform a determination of a candidate base address as shown in FIG. 5. More specifically, logic 1204, as illustrated in FIG. 12, computes a candidate base address when a miss happens. This computation is performed in accordance with: miss address-coeff*index. In FIG. 12, the miss address is miss2 508 and the coeff is 4. While only illustrated for one coefficient, the logic 1204 performs a similar computation for all coefficients.

Figure 13:
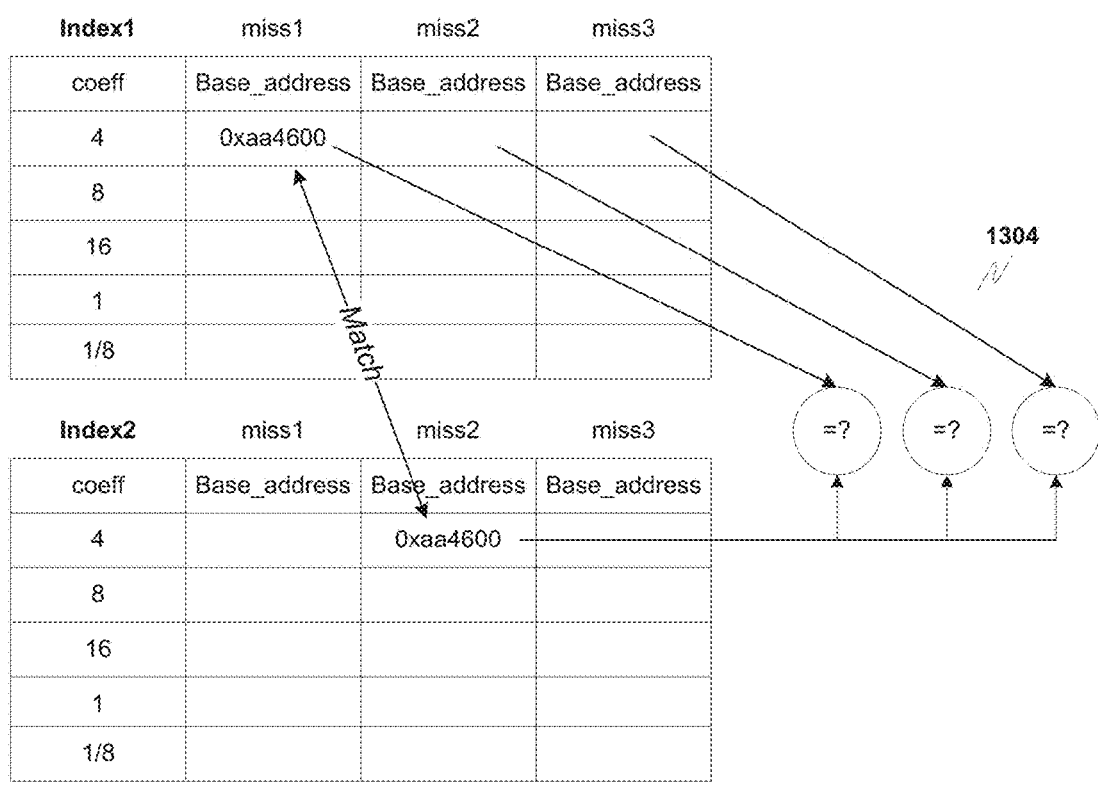
FIG. 13 illustrates exemplary comparison logic that performs a computation on the computed candidate base address with all previously computed and stored candidate base addresses for the same coefficient.

Then, as illustrated in FIG. 13, comparison logic 1304 performs a computation on the computed candidate base address with all previously computed and stored candidate base addresses for the same coefficient. If any of the newly computed candidate base addresses match any of the previously computed and stored candidate base addresses, then an indirect pattern has been detected.

Figure 14:
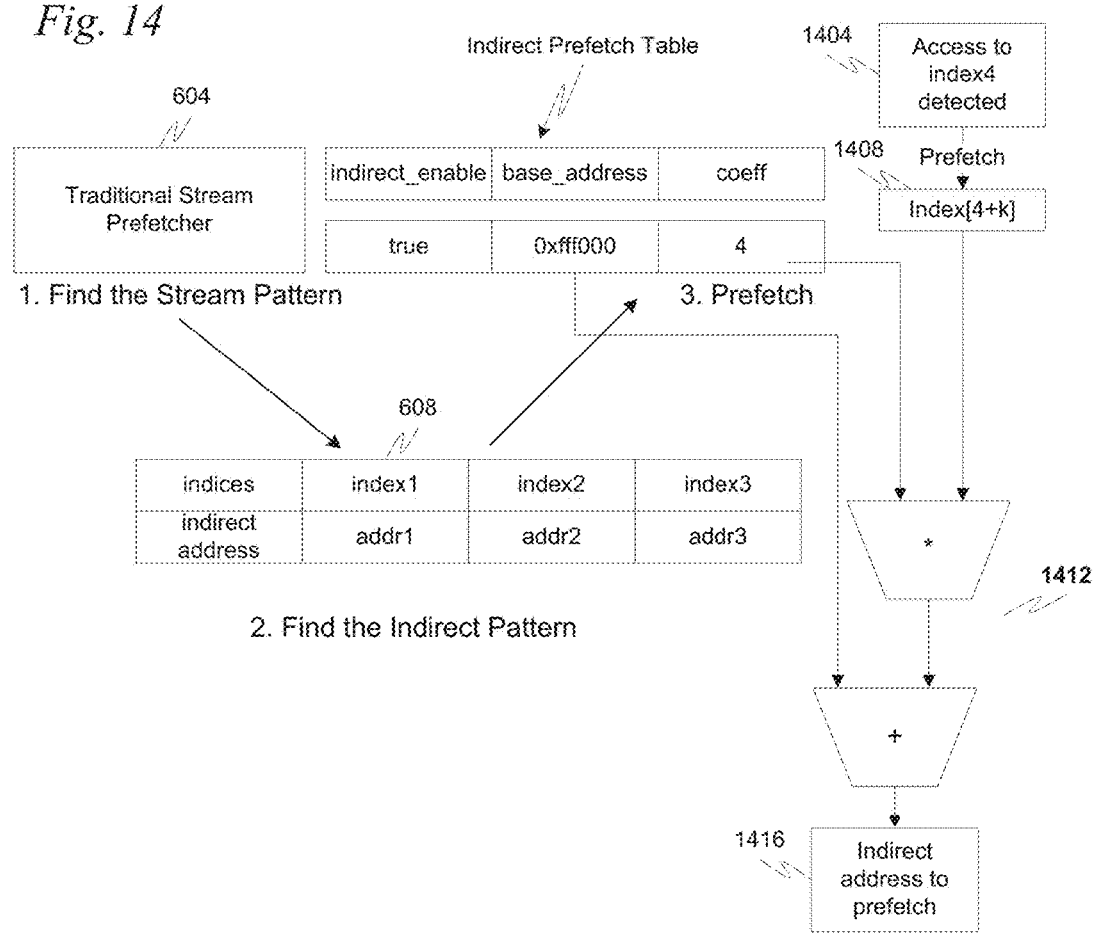
FIG. 14 illustrates logic for performing indirect address prefetching.

FIG. 14 illustrates a variation on the above embodiments, and in particular FIG. 6, and illustrates logic to perform cacheline prefetching. As an example, when software makes a request for index4, the stream prefetcher 604/1404 detects that the access is part of the stream of indices shown in 608 and that the request is also associated with an entry in the indirect prefetch table. This triggers hardware element 1408 to prefetch the cacheline containing index[4+k]. Once completed, logic 1412 reads the value of index[4+k] and determines the indirect address 1416 corresponding to the index value.

Figure 15:
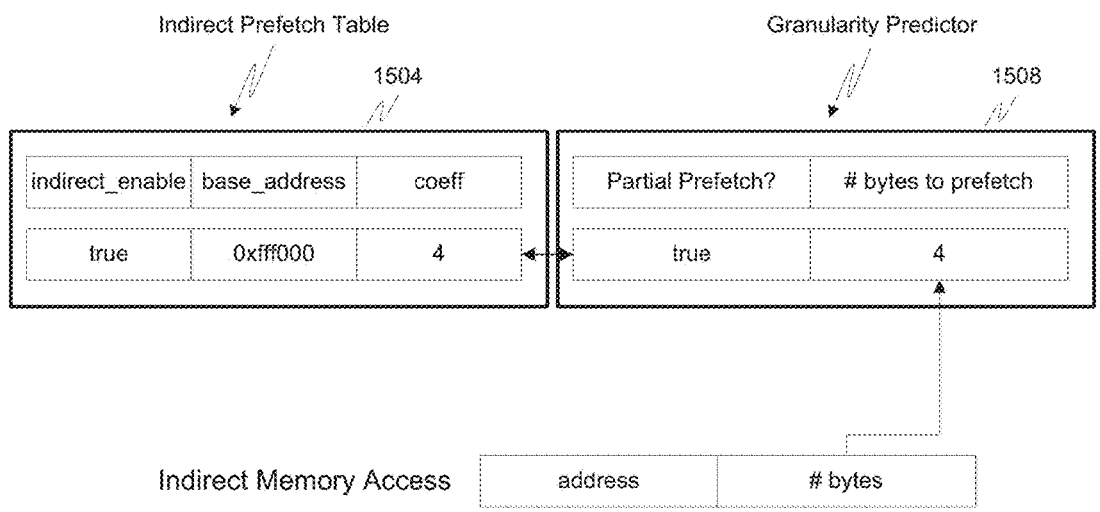
FIG. 15 illustrates logic for an exemplary granularity predictor.

FIG. 15 illustrates exemplary granularity predictor logic 1508. Each entry of the indirect prefetch table 1504 has a corresponding entry in the granularity predictor 1508 that holds/stores the number of bytes to prefetch. The value for the number of bytes to prefetch can be determined when an indirect pattern is detected. At that time, it has been determined that a given access that just missed in the cache, is an indirect access and is associated with this indirect pattern. In addition to an address, that access has an associated number of bytes. In one embodiment, the number of bytes is stored in a "number of bytes to prefetch" field of the granularity predictor entry associated with that indirect pattern.

Figure 16:
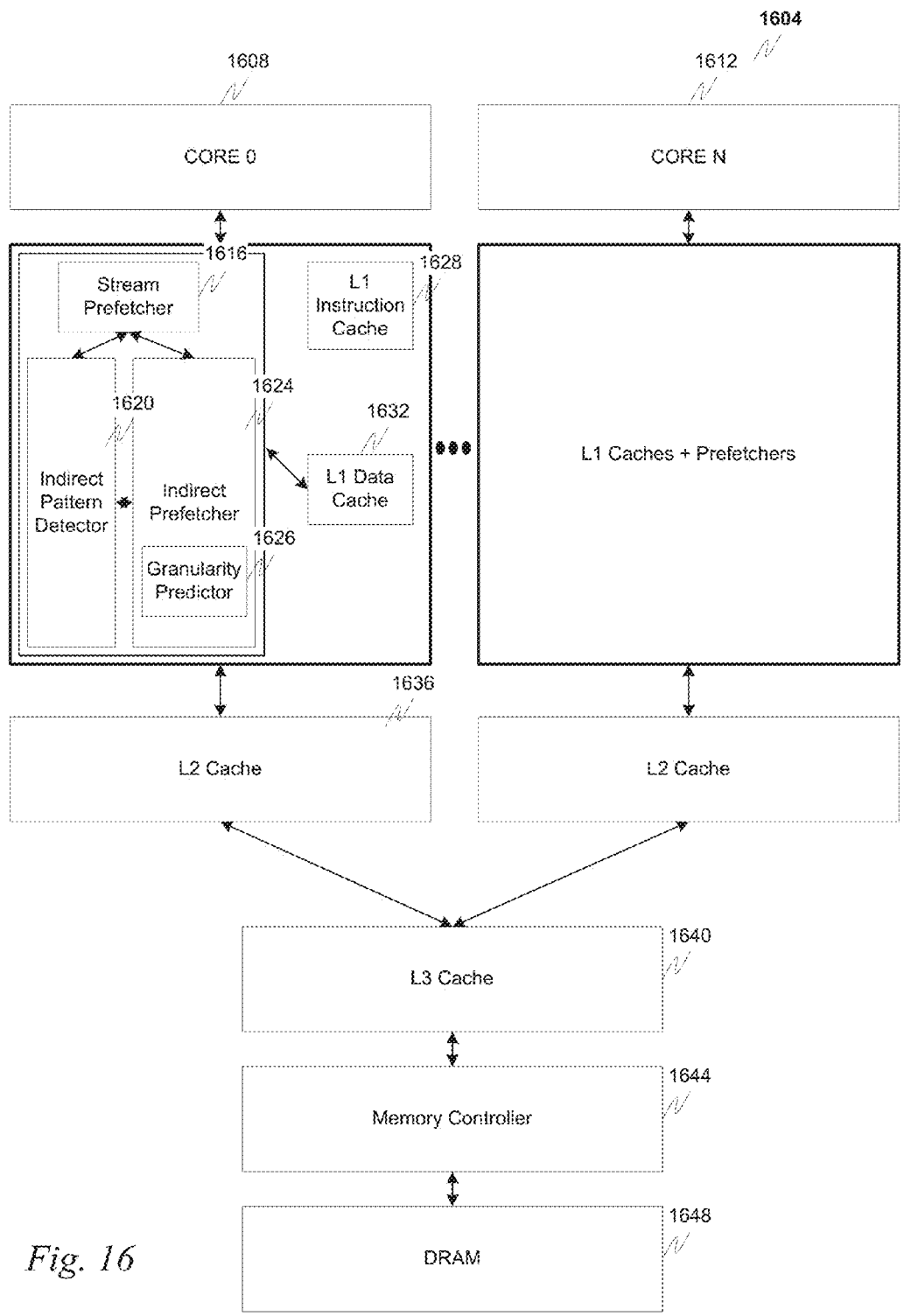
FIG. 16 illustrates an exemplary embodiment of the indirect prefetcher and partial cacheline access logic within a processor architecture.

FIG. 16 illustrates a variation on the above embodiments and shows an exemplary processor architecture 1604. The exemplary processor architecture 1604 includes one or more cores 1608-1612, each with respective componentry as shown. Additionally, the processor architecture 1604 includes an L3 cache 1640, a memory controller 1644 and a DRAM 1648. Each core, such as core 1608, includes a stream prefetcher 1616, an indirect pattern detector 1620, an indirect prefetcher 1624, a granularity predictor 1626, an L1 instruction cache and an L1 data cache, all interconnected or connectable via one or more links.

As outlined in the above embodiments, each core with its associated components are capable of performing pattern detection and prefetching as described. For example, the indirect pattern detector 1620 detects an indirect pattern. The indirect prefetcher 1624 can then read B a certain distance ahead, and prefetch the corresponding element in A. For example, if the "prefetch distance" is k, when index B[i] is accessed, the indirect prefetcher 1624 reads B[i+k], and then A[B[i+k]].

For partial cacheline accessing, the indirect accesses discussed above are usually accessing random memory locations and only touching/reading a small portion of a cacheline. Instead of loading the whole cacheline into L1 cache 1632, an exemplary embodiment uses the granularity predictor 1626 to load only part of the cacheline most likely to be used. As discussed, this technique can save at least bandwidth and power.

Exemplary aspects are directed toward:

A processor comprising:
a microcontroller to find a stream pattern;
indirect access detection logic to detect one or more indirect memory access patterns; and
indirect prefetcher logic to read an array a distance ahead, and prefetch a corresponding element in a memory.

Any one or more of the above aspects, wherein the array is an index array.

Any one or more of the above aspects, wherein the indirect prefetcher logic reads B[i+k] when B[i] is accessed, where B is the index array and k is a prefetch distance.

Any one or more of the above aspects, wherein the indirect prefetcher logic further reads A[B[i+k]] to fetch an element from array A.

Any one or more of the above aspects, further comprising a stream pattern detector within the microcontroller that detects a stream accessing pattern to array B.

Any one or more of the above aspects, wherein the indirect memory access pattern is equal to a size of a data element times a value from the index array plus a base address.

Any one or more of the above aspects, wherein at least two index accesses are tracked in conjunction with a number of cache misses.

Any one or more of the above aspects, further comprising memory that stores a size of a data element and a base address.

Any one or more of the above aspects, further comprising partial cacheline accessing logic to determine whether a whole cacheline or a part of the cacheline should be read into cache, and to read the determined cacheline or part of the cacheline into cache.

Any one or more of the above aspects, where a granularity detector determines a size of the part of the cacheline to read into cache.

A method comprising:
detecting one or more indirect memory access patterns; and
reading an array a distance ahead, and prefetching a corresponding element in a memory.

Any one or more of the above aspects, wherein the array is an index array.

Any one or more of the above aspects, wherein the reading reads B[i+k] when B[i] is accessed, where B is the index array and k is a prefetch distance.

Any one or more of the above aspects, wherein the reading further reads A[B[i+k]] to fetch an element from array A.

Any one or more of the above aspects, further comprising detecting a stream accessing pattern to array B.

Any one or more of the above aspects, wherein the indirect memory access pattern is equal to a size of a data element times a value from the index array plus a base address.

Any one or more of the above aspects, wherein at least two index accesses are tracked in conjunction with a number of cache misses.

Any one or more of the above aspects, further comprising storing a size of a data element and a base address.

Any one or more of the above aspects, further comprising determining whether a whole cacheline or a part of the cacheline should be read into cache, and reading the determined cacheline into cache.

Any one or more of the above aspects, further comprising determining a size of the part of the cacheline to read into cache.

A system comprising:
means for detecting one or more indirect memory access patterns; and
means for reading an array a distance ahead, and prefetching a corresponding element in a memory.

Any one or more of the above aspects, wherein the array is an index array.

Any one or more of the above aspects, wherein the reading reads B[i+k] when B[i] is accessed, where B is the index array and k is a prefetch distance.

Any one or more of the above aspects, wherein the reading further reads A[B[i+k]] to fetch an element from array A.

Any one or more of the above aspects, further comprising means for detecting a stream accessing pattern to array B.

Any one or more of the above aspects, wherein the indirect memory access pattern is equal to a size of a data element times a value from the index array plus a base address.

Any one or more of the above aspects, wherein at least two index accesses are tracked in conjunction with a number of cache misses.

Any one or more of the above aspects, further comprising means for storing a size of a data element and a base address.

Any one or more of the above aspects, further comprising means for determining whether a whole cacheline or a part of the cacheline should be read into cache, and means for reading the determined cacheline into cache.

Any one or more of the above aspects, further comprising means for determining a size of the part of the cacheline to read into cache.

A non-transitory computer readable information storage media having stored thereon instructions, that when executed by one or more processors, cause to be performed a method comprising:

detecting one or more indirect memory access patterns; and reading an array a distance ahead, and prefetching a corresponding element in a memory.

Any one or more of the above aspects, wherein the array is an index array.

Any one or more of the above aspects, wherein the reading reads B[i+k] when B[i] is accessed, where B is the index array and k is a prefetch distance.

Any one or more of the above aspects, wherein the reading further reads A[B[i+k]] to fetch an element from array A.

Any one or more of the above aspects, further comprising detecting a stream accessing pattern to array B.

Any one or more of the above aspects, wherein the indirect memory access pattern is equal to a size of a data element times a value from the index array plus a base address.

Any one or more of the above aspects, wherein at least two index accesses are tracked in conjunction with a number of cache misses.

Any one or more of the above aspects, further comprising storing a size of a data element and a base address.

Any one or more of the above aspects, further comprising determining whether a whole cacheline or a part of the cacheline should be read into cache, and reading the determined cacheline into cache.

Any one or more of the above aspects, further comprising determining a size of the part of the cacheline to read into cache.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a system and/or on the die.

The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exemplary techniques illustrated herein are not limited to the specifically illustrated embodiments but can also be utilized with the other exemplary embodiments and each described feature is individually and separately claimable.

Additionally, the systems, methods and techniques can be implemented on one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like. In general, any device capable of implementing a state machine that is in turn capable of implementing the methodology illustrated herein can be used to implement the various protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized.

Moreover, the disclosed methods may be readily implemented in software and/or firmware that can be stored on a storage medium, executed on programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated system or system component, or the like. The system can also be implemented by physically incorporating the system and/or method into a software and/or hardware system, such as the hardware and software systems of a processor.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures arrows are used to show connections and couplings.

The term "and/or" may have been used. As used herein, the term "and/or" means one or the other or both (e.g., A and/or B means A or B or both A and B).

In the description herein, specific details have been set forth in order to provide a thorough understanding of the embodiments. However, other embodiments may be practiced without some of these specific details. The scope of the embodiments is not to be determined by the specific examples provided above, but only by the claims below. In other instances, well-known circuits, structures, devices, and operations have been shown in block diagram form and/or without detail and/or omitted in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or otherwise clearly apparent.

Certain operations may be performed by hardware components, or may be embodied in machine-executable or circuit-executable instructions, that may be used to cause and/or result in a machine, circuit, or hardware component (e.g., a processor(s), core(s), potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may store or otherwise provide one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, servers, network devices (e.g., routers), Mobile Internet devices (MIDs), media players, smart televisions, nettops, miniature PC, set-top boxes, and video game controllers.

Reference throughout this specification to "one embodiment," "an embodiment," "one or more embodiments," "some embodiments," for example, indicates that a particular feature may be included in the practice of the technique but is not necessarily required to be. Similarly, in the description, various features are sometimes grouped together in a single embodiment, Figure, or description thereof for the purpose of streamlining the disclosure and aiding in the understanding of various inventive aspects. This method of disclosure, however, is not to be interpreted as reflecting an intention that the techniques herein require more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment.

Although embodiments described herein are describe in relation to processors, such as multicore processors including multiple cores, system agent circuitry, cache memories, and one or more other processing units, understand the scope of the present disclosure is not limited in this regard and embodiments are applicable to other semiconductor devices such as chipsets, graphics chips, memories and so forth. Also, although embodiments described herein are with regard to hardware prefetching, in accordance with an embodiment the system can be used to access data in other devices as well.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the disclosed techniques may be described with respect to a limited number of embodiments, those skilled in the art will appreciate numerous modifications and variations therefrom. It is intended that the appended claims cover all such modifications and variations that fall within the spirit and scope of the present disclosure.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of processors" may include two or more processors.

The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

It is therefore apparent that there has been provided systems and methods for hardware prefetching for indirect access patters. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A processor comprising:
a microcontroller to find a stream pattern;
indirect access detection logic to detect one or more indirect memory access patterns, the one or more indirect memory access patterns being based on a size of a data element and a base address, and when a candidate base address of a first index matches a candidate later base address, an indirect pattern exists; and
indirect prefetcher logic to read an array a prefetch distance ahead, and prefetch a corresponding element in a memory, wherein the prefetch distance varies based on a number of hits.

2. The processor of claim 1, wherein the array is an index array.

3. The processor of claim 2, wherein the indirect prefetcher logic reads B[i+k] when B[i] is accessed, where B is the index array and k is a prefetch distance.

4. The processor of claim 3, wherein the indirect prefetcher logic further reads A[B[i+k]] to fetch an element from array A.

5. The processor of claim 3, further comprising a stream pattern detector within the microcontroller that detects a stream accessing pattern to array B.

6. The processor of claim 2, wherein the one or more indirect memory access patterns is equal to a size of a data element times a value from the index array plus a base address.

7. The processor of claim 2, wherein at least two index accesses are tracked in conjunction with a number of cache misses.

8. The processor of claim 2, further comprising memory that stores a size of a data element and a base address.

9. The processor of claim 1, further comprising partial cacheline accessing logic to determine whether a whole cacheline or a part of the cacheline should be read into cache, and to read the determined cacheline or part of the cacheline into cache.

10. The processor of claim 9, where a granularity detector determines a size of the part of the cacheline to read into cache.

11. A method comprising:
detecting one or more indirect memory access patterns, the one or more indirect memory access patterns being based on a size of a data element and a base address, and when a candidate base address of a first index matches a candidate later base address, an indirect pattern exists; and
reading an array a perfetch distance ahead, and prefetching a corresponding element in a memory, wherein the prefetch distance varies based on a number of hits.

12. The method of claim 11, wherein the array is an index array.

13. The method of claim 12, wherein the reading reads B[i+k] when B[i] is accessed, where B is the index array and k is a prefetch distance.

14. The method of claim 13, wherein the reading further reads A[B[i+k]] to fetch an element from array A.

15. The method of claim 13, further comprising detecting a stream accessing pattern to array B.

16. The method of claim 12, wherein the one or more indirect memory access patterns is equal to a size of a data element times a value from the index array plus a base address.

17. The method of claim 12, wherein at least two index accesses are tracked in conjunction with a number of cache misses.

18. The method of claim 12, further comprising storing a size of a data element and a base address.

19. The method of claim 11, further comprising determining whether a whole cacheline or a part of the cacheline should be read into cache, and reading the determined cacheline into cache.

20. The method of claim 19, further comprising determining a size of the part of the cacheline to read into cache.

* * * * *